UNITED STATES PATENT OFFICE.

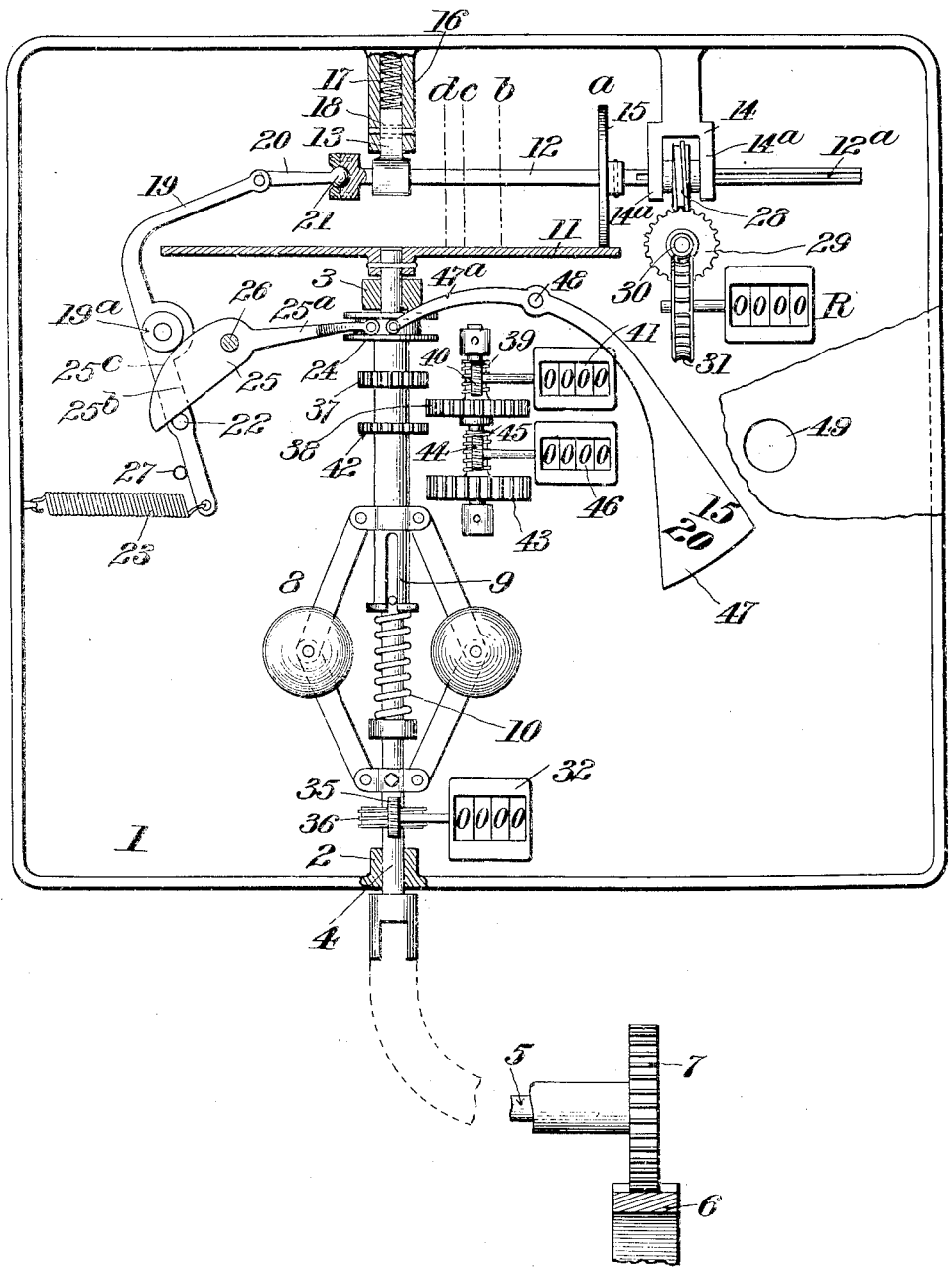

RALPH SHIPMAN, OF SUNBURY, PENNSYLVANIA.

SPEED AND RUNNING-TIME INDICATOR.

1,195,280.  Specification of Letters Patent.  Patented Aug. 22, 1916.

Application filed November 1, 1912. Serial No. 729,034.

*To all whom it may concern:*

Be it known that I, RALPH SHIPMAN, a citizen of the United States, residing at Sunbury, in the county of Northumberland and State of Pennsylvania, have invented certain new and useful Improvements in Speed and Running-Time Indicators, of which the following is a specification.

This invention relates to an instrument for indicating the running time of a machine or vehicle,—that is, the actual time that the machine is in operation during a trip or any period of time,—and it comprises a driving member and means for operating the same at a speed proportional to the speed of the machine, a driven member and means for operating the driven member at a constant speed from said driving member, and an indicator operated by said constant speed member for indicating, in hours and fractions thereof, the time the machine is in operation.

The invention also comprises means for indicating the distance which the machine is driven at speeds in excess of a given speed.

The instrument is particularly desirable for the purpose of enabling the owner of a motor vehicle, such as a truck or delivery wagon, to determine how long the machine has been in actual operation and whether it has been operated at a speed in excess of a given speed, and for what distance it has been operated at an excess speed, thus providing a check on the driver's time and on his usage of the machine.

While particularly desirable on commercial vehicles, it is also desirable on pleasure vehicles for indicating the running time and the distance traveled in excess of a given speed.

In the accompanying drawing, which illustrates my invention, 1 indicates a suitable casing for containing the registering mechanism, and this casing is provided with suitable bearings 2 and 3, in which is mounted a driving spindle 4. This spindle, when the instrument is applied to a vehicle, is connected to a flexible shaft 5, which is driven at a speed proportional to the speed of the vehicle, by a driving gear 6, on one of the vehicle wheels and a pinion 7, connected to the flexible shaft. On the spindle 4 is mounted a centrifugal governor 8 which causes a sleeve 9, on the spindle, to move downward against the action of a spring 10 as the speed of the spindle increases, and the spring causes the sleeve to move upward as the speed of the spindle decreases. A disk 11, secured to the upper end of the spindle, rotates with it at the same speed as the spindle, and therefore at a speed proportional to the speed of the vehicle. A shaft 12 is mounted in bearings 13 and 14, above the disk 11, and substantially parallel with its surface. The shaft 12 is arranged radially with respect to the axis of the disk 11, and it is movable longitudinally in the bearings 13 and 14. A disk 15, secured to the shaft 12, is arranged to roll upon the disk 11 and to be driven frictionally by the latter disk. In order to keep the disk 15 in rolling contact with the disk 11 at all times, without undue pressure, the bearing 13 is slidably mounted in a housing 16, secured to the casing, and a spring 17, within the housing, presses the bearing 13 lightly downward toward the disk 11. A pin 18, extending through an opening in the shank of the bearing 13, limits the movement of said bearing. A lever 19 is connected to one end of the shaft 12 by a link 20, the latter being attached to the shaft by a ball joint 21. The lever 19 is pivoted at 22 to the casing, and a spring 23, connected between the lever and the casing, tends to hold the lever and shaft 12 in the positions shown in the drawing, with the disk 15 near the periphery of the disk 11. The sleeve 9, operated by the governor, has a flanged collar 24 at its upper end, and a cam lever 25, pivoted at 26 to the casing, has an arm 25$^a$ which engages the collar, so that as the collar moves in response to changes in speed, the cam lever 25 will be rocked. The arm 25$^b$ of the cam lever has a cam surface 25$^c$ which engages a roller 19$^a$ upon the lever 19, and when the sleeve 9 on the spindle 4 is moved downward, by the action of the governor, the cam lever 25, bearing against said roller, rocks the lever 19 against the action of the spring 23, causing the shaft 12 to move in a direction to carry the disk 15 toward the center of the disk 11. When the sleeve 9 moves upward, rocking the cam lever in the opposite direction, the spring 23 rocks the lever 19 and through said latter lever, forces the shaft 12 and disk 15 back into the position shown in the drawing, the limit of movement in this direction being controlled by a stop 27. The shaft 12 has a long slot 12$^a$ and a worm 28, mounted between the forks 14ª of the bearing 14, is keyed to the shaft 12 by means of a suitable spline fitting within the slot 12ª, the arrangement being such that the shaft may slide freely through the hub of the worm 28, but the latter will turn with the shaft. This worm engages a worm wheel 29 to which is secured a worm 30, the latter engaging a worm wheel 31 upon the shaft of a register R.

The operation of the device thus far described, is as follows: The spindle 4 and disk 11 are driven by the shaft 5 and gears 6 and 7 at a speed proportional to the speed of the vehicle or other machine and, of course, the disk 11 will make a given number of revolutions for each mile that the vehicle travels. If, for example, the gears 6 and 7 are proportioned so as to cause the disk 11 to make twelve hundred revolutions per mile, and the vehicle is driven at a speed of five miles per hour, the disk 11 will turn six thousand times in the hour. As motor vehicles are usually operated at speeds above five miles per hour, the latter speed will be assumed to be the minimum speed at which the instrument operates to register running time, and the disk 15 is shown in the position $a$ which it occupies at its minimum speed. In this position, the circular path which the disk 15 travels on the disk 11 is three times greater than the circumference of the disk 15, and hence, when the vehicle is running five miles per hour, and the disk 11 is turning at the rate of six thousand revolutions per hour, the disk 15 and its shaft 12 will turn at the rate of eighteen thousand revolutions per hour. If, now, the speed of the vehicle is increased from five to ten miles per hour, the governor will cause the disk 15 to move from its position $a$ to a position indicated by the dotted line $b$ where its path of travel on the disk 11 will be only one-half as great as its path of travel in the position $a$; but the speed of the disk 11 being doubled, it will be evident that the disk 15 and shaft 12 will rotate at the same speed as before, viz: at the rate of eighteen thousand revolutions per hour. Again, if the speed is increased to fifteen miles per hour, the governor will move the disk 15 to a position indicated by the dotted line $c$, where its path of travel on the disk 11 is of the same length as its own circumference, and as the speed of the disk 11 will be increased to eighteen thousand revolutions per hour, the disk 15 and shaft 12 will turn at the same speed. If the vehicle speed increases to twenty miles per hour, the governor will move the disk 15 to a position $d$, where the path of travel of the disk 15 on the disk 11 is equal to three-fourths of the circumference of the disk 15, and as the disk 11 will then be driven at the rate of twenty-four thousand revolutions per hour, the disk 15 and shaft 12 will turn at the rate of eighteen thousand revolutions per hour. It will be evident that at all speeds of the vehicle and of the disk 11, from the lowest assumed speed to the highest, the shaft 12 will turn at a constant speed, and therefore, with properly proportioned transmitting gearing 28—31, the register R will operate to register the number of hours that the vehicle is in operation, or the running time.

If it is desired to indicate running times at speeds below the assumed lowest speed of five miles per hour, this can be accomplished by enlarging the disk 11 and arranging the parts so that the shaft 12 and disk 15 may move farther to the right. This may be desirable for heavy trucks in hilly regions or situations where the truck is compelled to travel at a speed lower than five miles per hour; but as light delivery vehicles and pleasure cars are generally run at a speed of over five miles per hour, the occasional short distances which they run at lower speeds may be neglected, and for practical purposes on such vehicles, it is unnecessary to register running times at speeds below five miles per hour.

By means of the above described mechanism, the owner of a vehicle is kept advised of the actual number of hours that the vehicle is in motion during a given trip, or during any given period of time, such as a year. By comparing the register R with a distance register or odometer 32, which is connected to the spindle 4 by gears 35 and 36, the average speed for any given distance or any period of time may be determined.

For the purpose of avoiding unnecessary wear and tear on trucks and delivery wagons, and storage batteries when such are used, it is desirable to limit the drivers of the trucks to certain maximum speeds, and to provide means whereby any violation of the instructions given to the driver will be made apparent. If the driver is allowed one hour in which to make a trip covering a distance of twelve miles, the register R will indicate the actual running time consumed in making the trip, and will therefore show whether the driver has consumed the time in traveling at a moderate speed, or whether he has made a long stop and driven the vehicle at a high speed to get back within the hour. As an additional check upon the usage of the vehicle, I have provided means whereby the distance traveled in excess of given speeds are registered. On the sleeve 9 is secured a gear 37 which, when the speed of the vehicle is below a given limit, say fifteen miles per hour, stands above and out of mesh with a gear 38, which latter gear is connected by worm gearing 39 and 40 with a distance register 41. When the speed reaches fifteen miles per hour, the sleeve 9 moves far enough downward to cause the gear 37 to engage the gear 38 and thereby operate the register 41. If the speed slackens, the gear 37 moves out of engagement with the gear 38 and the register 41 ceases to operate. The teeth of the gears 37 and 38 are of such length that after engagement, at a speed of fifteen miles per hour, they will remain in engagement while the vehicle is moving at any speed between fifteen and twenty miles per hour, thus causing the register 41 to record distances traveled at speeds between fifteen and twenty miles per hour. If the speed exceeds twenty miles per hour, another gear 42 on the sleeve 9 engages a gear 43, connected by worm gears 44 and 45 with a register 46, and the teeth on the gear 43 are of such length that the gear 42 will remain in engagement therewith, at any speed of the vehicle above twenty miles per hour. Thus, the register 46 will register the distance traveled at a speed of twenty miles per hour, or any greater speed. Thus, it will be seen that if the driver is instructed to keep his speed below fifteen miles per hour, and follows his instructions, neither of the registers, 41 or 46, will be operated, but if he exceeds the speed limit, one or both of the registers will show the distance traveled at excessive speeds. If he is permitted to operate the vehicle at any speed below twenty miles per hour, but not above that speed, then the register 46 will indicate whether he has disobeyed his instructions and if so, to what extent.

As the figures on the register wheels are not easily read from a distance, I provide means for signaling the driver when he has exceeded his speed limit. For this purpose, a signal lever 47 is pivoted at 48 to the wall of the casing, and one arm 47ª of the lever engages the collar 24 on the sleeve 9, so that as the sleeve moves, the signal lever or plate 47 will be rocked, and when the sleeve moves downward to a point where the gear 37 engages the gear 38, the free end of the signal lever will expose through an opening 49 in the front plate, the numeral "15" shown upon the signal plate. If the speed increases to twenty miles an hour, the numeral "20" on the signal plate will be exposed through the opening 49. Thus, the driver's attention will be called to the fact that he has reached or exceeded his limit of speed, and to obey instructions he should slow down the vehicle.

What I claim is:

1. Means for indicating the running time of a machine comprising a driving member and means for rotating the same at a speed proportional to the speed of the machine, a driven member in rolling engagement with the driving member, means responsive to variations in the machine speed for adjusting one of said members with relation to the axis of the other member so as to maintain the driven member at a constant speed, and an indicator operatively connected to the driven member.

2. Means for indicating the running time of a machine comprising a driving member and means for rotating the same at a speed proportional to the speed of the machine, a driven member in rolling engagement with the driving member, means responsive to variations in the machine speed for moving the driven member toward and from the axis of the driving member, and an indicator operatively connected to the driven member.

3. Means for indicating the running time of a machine comprising a driving member and means for rotating the same at a speed proportional to the speed of the machine, a driven member in rolling engagement with the driving member, means responsive to variations in the machine speed for moving the driven member toward and from the axis of the driving member, an indicator and reduction gearing connecting said driven member with the indicator.

4. Means for indicating the running time of a machine comprising a driving disk and means for rotating the same at a speed proportional to the speed of the machine, a driven disk in rolling engagement with a side of the driving disk, means, responsive to variations in the machine speed for moving the driven disk toward and from the axis of the driven disk, and an indicator operatively connected to the driven disk.

5. Means for indicating the running time of a machine comprising a shaft and means for driving the same at a speed proportional to the speed of the machine, a driving disk on said shaft, a driven disk in rolling engagement with the driving disk, a centrifugal governor on said shaft, connections between said governor and the driven disk for shifting the position of said driven disk, and an indicator operatively connected to the driven disk.

6. Means for indicating the running time of a machine comprising a shaft, driven by the machine, a driving disk on said shaft, a centrifugal governor connected to the shaft, a second shaft, arranged radially over said disk, a driven disk secured to the latter shaft in rolling engagement with the driving disk, connections between said governor and second shaft for giving an endwise movement to the latter, and an indicator operatively connected to said second shaft.

7. Means for indicating the running time of a machine comprising a driving member and means for rotating the same at a speed proportional to the speed of the machine, a driven member in rolling engagement with the driving member, an indicator operatively connected to the driven member, a governor movable with the driving member, a cam operated by said governor, and means movable by said cam for shifting the position of said driven member with respect to the axis of the driving member.

8. Means for indicating the running time of a machine comprising a driving member and means for rotating the same at a speed proportional to the speed of the machine, a driven member in rolling engagement with the driving member, a shaft to which said driven member is secured, an indicator operatively connected to said shaft, a governor movable with the driving member, and means operable by the governor for moving said shaft endwise.

9. Means for indicating the running time of a machine comprising a driving member and means for rotating the same at a speed proportional to the speed of the machine, a driven member in rolling engagement with the driving member, an indicator operatively connected to the driven member, a governor movable with the driving member, a cam operated by said governor, a lever movable by said cam and a shaft carrying said movable member adapted to be moved by said lever.

10. Means for indicating the running time of a machine comprising a driving shaft, a governor and a driving disk on said shaft, means for rotating said shaft, governor and disk at a speed proportional to the speed of the machine, a driven shaft, a gear slidably mounted thereon, said latter shaft arranged radially with respect to the driving disk and movable endwise through its bearings and through said gear, means controlled by the governor for moving said driven shaft endwise, an indicator, and gearing connecting the register with the gear on the driven shaft.

11. Means for indicating the running time of a machine comprising a driving shaft, a governor and a driving disk on said shaft, means for rotating said shaft, governor and disk at a speed proportional to the speed of the machine, a driven shaft, a gear slidably mounted thereon, said latter shaft arranged radially with respect to the driving disk and movable endwise through its bearings and through said gear, a spring normally pressing said driven shaft toward the driving disk, means controlled by the governor for moving said driven shaft endwise, a time-indicator, and gearing connecting the indicator with the gear on the driven shaft.

In testimony whereof I have affixed my signature, in presence of two witnesses.

RALPH SHIPMAN.

Witnesses:
E. W. MARSHALL,
R. J. DEARBORN.